J. J. DINNAN.
Knob Attachment.

No. 222,817. Patented Dec. 23, 1879.

Attest  
Julius Twiss  
Henry G. Newton

John J. Dinnan,  
Inventor.

UNITED STATES PATENT OFFICE.

JOHN J. DINNAN, OF NEW HAVEN, CONNECTICUT, ASSIGNOR OF ONE-HALF OF HIS RIGHT TO HENRY ROGERS, OF SAME PLACE.

IMPROVEMENT IN KNOB ATTACHMENTS.

Specification forming part of Letters Patent No. 222,817, dated December 23, 1879; application filed July 8, 1879.

*To all whom it may concern:*

Be it known that I, JOHN J. DINNAN, of New Haven, in the county of New Haven and State of Connecticut, have invented a new and useful Improvement in Door-Knob Extensions, which improvement is fully set forth in the following specification and accompanying drawings.

My invention is an improvement in that class of extension door-knobs and spindles which are so constructed that a knob or knobs may be adjusted to doors of different thicknesses.

Figure 1:
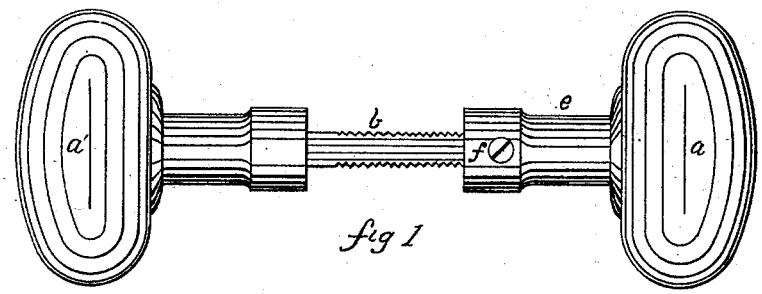
Figure 2:
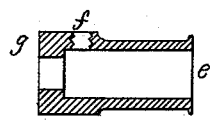
Figure 3:
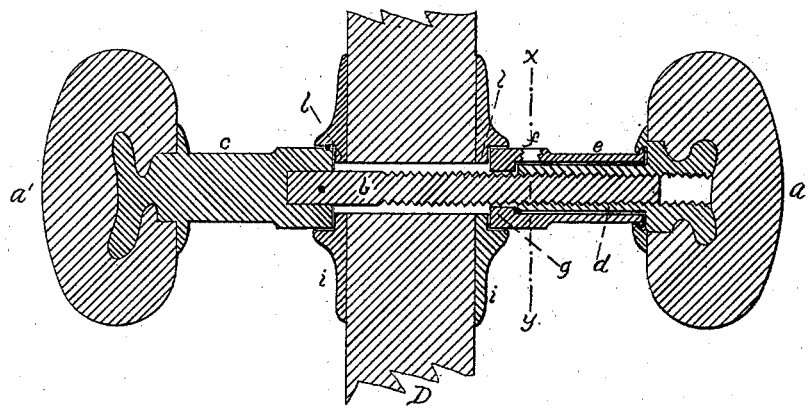
Figure 4:
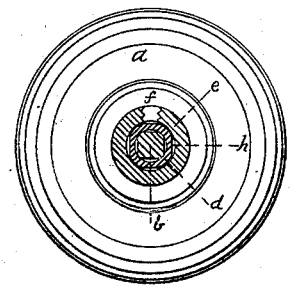
Figure 5:
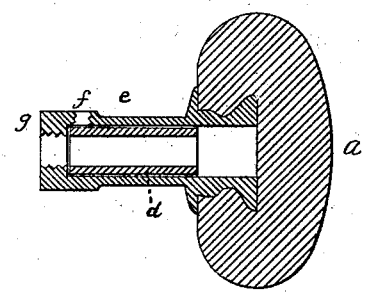

Figure 1 is an elevation of a pair of door-knobs; Fig. 2, the shank-sleeve. Fig. 3 shows a section of a door with sections of roses and knobs fitted thereto, and a longitudinal section of the spindle, shank, &c., connected therewith; Fig. 4, a section on line $x\ y$ of Fig. 3. Fig. 5 shows an unthreaded internal shank fitted to slide on the spindle, and having a fixed sleeve with its flange threaded to receive the spindle-thread.

Similar letters of reference indicate corresponding parts.

$a\ a'$ represent a pair of door-knobs connected by means of the spindle $b$. The spindle $b$ is firmly fixed in the shank $c$ of the knob $a'$, and screws into the threaded shank $d$, which is fixed to the opposite knob $a$. By this means the distance between the two knobs is regulated with reference to the door on which they are placed.

$e$ is a sleeve, with cylindrical smooth unthreaded internal surface fitting nicely over the whole length of the shank $d$, and having a flange shaped to form an opening suited to receive the spindle and allow it to slide therein. I, by preference, secure said sleeve so that it cannot be readily withdrawn from the shank, yet in such a manner that said shank may revolve freely therein. This is easily done by turning up a slight flange on the end of the sleeve next the knob, and spinning the edge of the metallic knob-rim (through which the shank and sleeve are inserted) over said flange with a tool.

When the knobs are being adjusted so that they may be at the desired distance apart, the shank $d$ revolves within the sleeve $e$, and the flange $g$ upon the sleeve $e$ is pushed along the spindle while the shank $d$ is being screwed to its place, until said flange reaches the desired position in the socket $l$ of the rose $i$. When the knobs have been adjusted the set-screw $f$, placed in the sleeve, is turned so as to bear forcibly upon the shank $d$, and so as to prevent said shank from being revolved independently of the sleeve, whereupon, by the bearing of the flange $g$ upon the spindle, the revolution of the shank independently of the spindle is prevented, a very nice adjustment is easily and quickly obtained, and all rose-screws may be dispensed with.

The roses, being provided with points to penetrate the door, may be made to fit very snugly by screwing the knobs to their proper position, and will be prevented from working loose by the pressure of the knob-shanks against the rose-sockets. Preferably, I make the shank with four or more flattened places thereon, which, when said shank is revolved in the sleeve, will successively come under the screw in the sleeve, and upon any one of which said screw may be set. The set-screw, thus having a broad bearing upon the shank, is not liable to become loosened or to wear the sleeve in which it is inserted, as would be the case if it were screwed into the spindle in the usual manner.

Although I use a sleeve, $e$, (with flange $g$, having an opening to receive the spindle) over a fixed shank, it is evident that the same purpose may be substantially accomplished by firmly attaching the sleeve $e$ to the knob, threading the opening in the flange to receive the spindle-thread, and making the internal part of the shank square, with unthreaded surface to receive the end of the spindle when it projects through the opening in the flange. The spindle can then be forced therein by screwing it through the flange of said outer sleeve or shank. In that case, as soon as the threaded end of the spindle has been screwed through said flange, it will, when introduced into said internal part of the shank, turn the latter, which, as in this case it is not fixed, will continue to revolve within the outer or fixed shank until the spindle is screwed to its desired position, in which it may readily be secured.

It is evident that in either case, whether the external sleeve or the internal part fitted to receive the spindle is firmly attached to the knob, the two parts constitute together a divided or two-part knob-shank, it only being necessary that the threaded part of the shank shall be fixed, while the knob may revolve independently of the sliding part until the desired adjustment of the knob is effected.

While I prefer to secure the external part or sleeve of the shank to the internal part of said shank by a screw passing through the sleeve and bearing upon said internal part of said shank, the screw may be made to also pass through the internal part and bear upon the spindle, or a pin, bolt, or other suitable device may be used in place of the screw to secure the sleeve, it only being necessary that there be some means of securing the sleeve to the inner part of the shank, (after the desired adjustment of the knob is made,) so that the one cannot be revolved independently of the other.

If desired, a still greater extension may be secured by using a two-part knob-shank on both knobs, or by using a two-part shank on one end of the spindle, and on the other end a knob with the ordinary shank, adjustable on the spindle by sliding, and secured to the same by a screw. In either case it is evident that great nicety of adjustment can be secured.

I do not claim, broadly, a divided or two-part knob-shank, as I am aware that two-part shanks have heretofore been made; neither do I claim, broadly, a knob-shank having an adjustable sleeve.

My improvement possesses, as I believe, the advantage of conferring greater facility in adjusting knobs to doors, greater nicety of adjustment, with stability of the adjustment as effected, and the possibility of very easy readjustment, if desired.

I claim—

1. A door-knob shank composed of the internal round part, $d$, and the external part, $e$, extending the entire length of said round part $d$, and having, as forming a part of itself, a flange, $g$, said parts having their meeting surfaces unthreaded and smooth, so that the part $d$ may be revolved freely within and independent of the part $e$, and both said part $d$ and said flange $g$ being fitted to receive and have a bearing upon a square spindle threaded on its corners, the bearing-surface of one being screw-threaded, all substantially as described.

2. The combination of a door-knob, $a$, having a round and internally-threaded shank, $d$, with sleeve $e$, having a flange, $g$, with a square opening, and a screw, $f$, the meeting surfaces of said shank $d$ and sleeve $e$ being unthreaded and smooth, all substantially as set forth.

3. The combination of the knob $a$, having a round shank, $d$, with sleeve $e$ extending to said knob, the meeting surfaces of said shank and sleeve being unthreaded, and said sleeve having a flange, $g$, and provided with a screw, $f$, with the spindle $b$ screw-threaded on its corners, and rose $i$ with a round socket $l$, all substantially as described.

JOHN J. DINNAN.

Witnesses:
CHARLES K. BUSH,
HENRY G. NEWTON.